United States Patent
Roose et al.

(10) Patent No.: US 10,218,178 B2
(45) Date of Patent: Feb. 26, 2019

(54) DYNAMIC REACTIVE COMPENSATION

(71) Applicant: University of Hawai'i, Honolulu, HI (US)

(72) Inventors: Leon Roy Roose, Kaneohe, HI (US); Staci T. C. L. Sadoyama, Honolulu, HI (US); Hsun Jou, Honolulu, HI (US); Marc Minoru Matsuura, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 38 days.

(21) Appl. No.: 15/644,262

(22) Filed: Jul. 7, 2017

(65) Prior Publication Data

US 2018/0013287 A1    Jan. 11, 2018

Related U.S. Application Data

(60) Provisional application No. 62/359,393, filed on Jul. 7, 2016, provisional application No. 62/445,203, filed on Jan. 11, 2017.

(51) Int. Cl.
*H02J 3/18* (2006.01)
*G05B 19/042* (2006.01)

(52) U.S. Cl.
CPC .......... *H02J 3/1828* (2013.01); *G05B 19/042* (2013.01); *G05B 2219/2639* (2013.01)

(58) Field of Classification Search
USPC ....................................................... 700/295
See application file for complete search history.

(56) References Cited

U.S. PATENT DOCUMENTS

| 6,605,940 | B1* | 8/2003 | Tabrizi ................. G01D 5/2291 324/202 |
| 9,639,104 | B2* | 5/2017 | Divan ....................... G05F 1/70 |
| 2005/0057950 | A1* | 3/2005 | Colby ................... H02J 3/1835 363/74 |
| 2008/0281474 | A1 | 11/2008 | Patel |
| 2014/0062086 | A1* | 3/2014 | Mata Dumenjo ..... H02J 3/1842 290/44 |
| 2014/0103888 | A1 | 4/2014 | Divan et al. |
| 2014/0232357 | A1 | 8/2014 | Huomo |

OTHER PUBLICATIONS

International Search Report and Written Opinion of the International Searching Authority dated Sep. 15, 2017 in connection with PCT/US17/41154.

* cited by examiner

*Primary Examiner* — Mohammad Ali
*Assistant Examiner* — Joshua T Sanders
(74) *Attorney, Agent, or Firm* — Parker Ibrahim & Berg LLP; James M. Behmke; Stephen D. LeBarron

(57) ABSTRACT

In one embodiment, a computing device determines real and reactive power flows at a transformer at a given time, and computes, based on the real power and reactive power flow at the transformer, an amount of reactive power adjustment to produce a desired voltage differential across the transformer. The computing device may then adjust the reactive power flow from a secondary side of the transformer at substantially the given time based on the computed amount.

28 Claims, 13 Drawing Sheets

DYNAMIC REACTIVE COMPENSATION

RELATED APPLICATIONS

This application claims priority to U.S. Provisional Application No. 62/359,393, filed on Jul. 7, 2016, entitled "HNEI-CVR", by Roose, et al., the contents of which are hereby incorporated by reference.

This application also claims priority to U.S. Provisional Application No. 62/445,203, filed on Jan. 11, 2017, entitled "Conservation Voltage Reduction", by Roose, et al., the contents of which are hereby incorporated by reference.

GOVERNMENT SUPPORT

This invention was made with government support under grant no. N00014-12-1-0496 awarded by the Department of the Navy/Office of Naval Research. The government has certain rights in the invention.

TECHNICAL FIELD

The present disclosure relates generally to power grid technology, and, more particularly, to dynamic reactive compensation, such as for advanced conservation voltage reduction (CVR).

BACKGROUND

In electrical systems, ranging from smaller circuitry to power grid systems, standards are often established that define recommended voltage ratings and operating tolerances. In particular, the American National Standard Institute (ANSI) has established a standard (e.g., standard 084.1, "For Electric Power Systems and Equipment—Voltage Ratings (60 Hertz)"), that defines recommended voltage ratings and operating tolerances for 60-hertz electrical power systems above 100 volts. This particular standard, for instance, defines the service voltage (voltage at the point of delivery) to be no more than plus or minus 5% of the nominal voltage. For example, based on a 120-volt nominal system, the voltage should not go below 114 volts or above 126 volts. Generally, it has been the electric power utility's responsibility to manage voltage at its service point.

Conservation voltage reduction (CVR) is a method to improve the efficiency of electric sources, such as the electric power grid, by optimizing voltage on the feeders that co supply electricity to end-use devices (e.g., optimizing voltage on the feeders that run from substations to customers), thus reducing energy consumption. Traditional conservation of voltage methods for distribution feeders within power grids have been performed by controlling a load tap changer (LTC) at the substation transformer, and is inherently limited to lowering the voltage of the connected power distribution feeder(s) no lower than the lowest performing voltage point on the feeder(s), maintaining at least the minimum of 114 volts at the lowest point.

SUMMARY

The techniques herein relate generally to dynamic reactive compensation for controlling voltage in a manner to minimize the voltage differential (e.g., drop, increase, and/or variation/fluctuation according to an expected voltage) across a transformer (e.g., a distribution service transformer on an electrical power grid). In particular, by measuring the real and reactive power flow at a transformer, an adjusted amount of reactive power may be computed and either absorbed or produced in order to minimize the effects of various loads and sources on the voltage at the transformer.

Specifically, according to one or more embodiments of the disclosure, a computing device determines real and reactive power flows at a transformer at a given time, and computes, based on the real power and reactive power flow at the transformer, an amount of reactive power adjustment to produce a desired voltage differential across the transformer. The computing device may then adjust the reactive power flow from a secondary side of the transformer at substantially the given time based on the computed amount.

Additional and/or alternative embodiments may be described in greater detail below, and this Summary is merely illustrative, and is not meant to be limiting to the scope of the present disclosure. For example, the techniques herein may be specifically adapted for use with various conservation voltage reduction (CVR) techniques, as described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
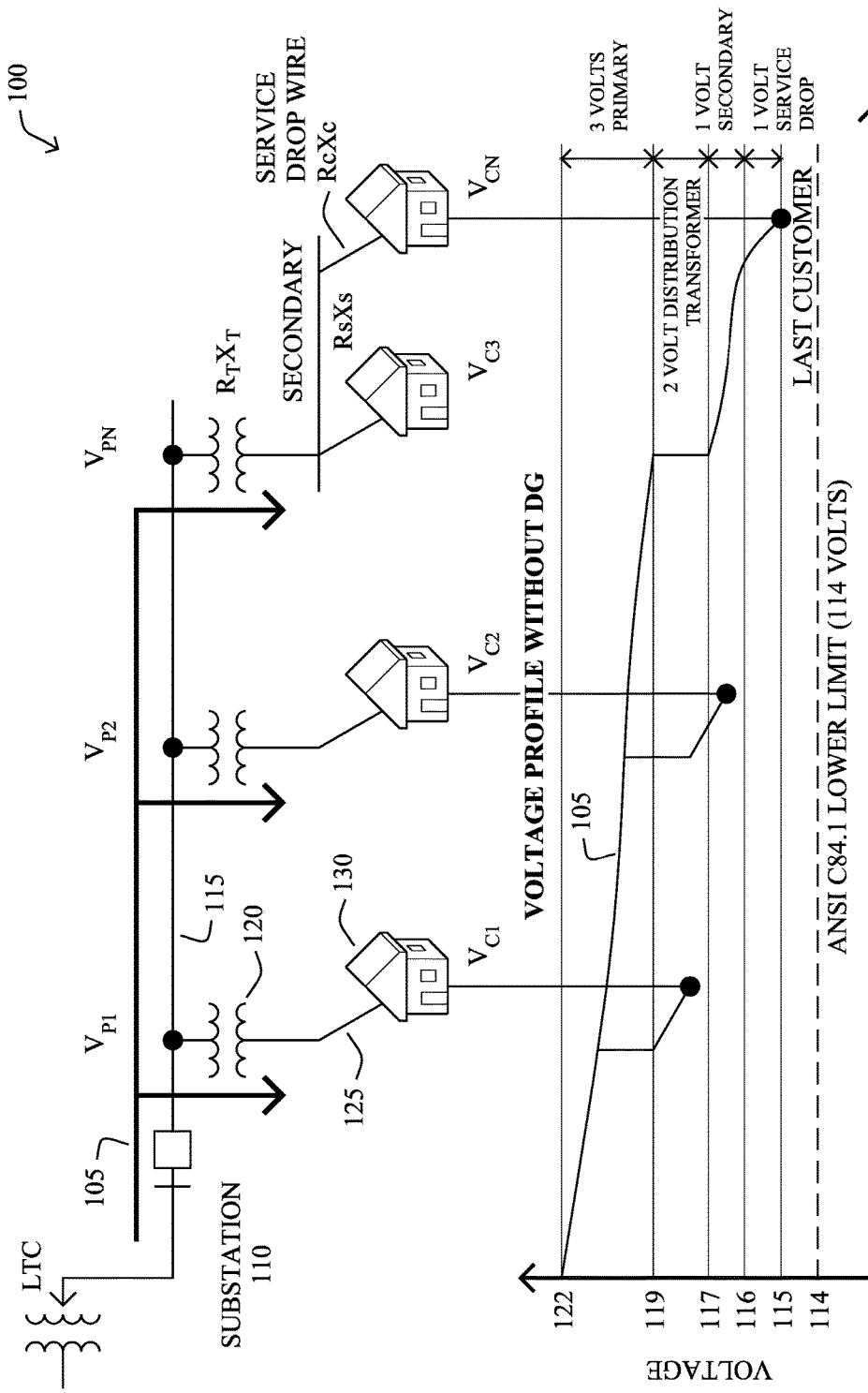
FIG. 1 illustrates an example voltage profile along a power grid feeder line.

Generally, in electric power distribution systems/grids, which are an illustrative embodiment of the present disclosure, a distribution (or service) transformer reduces or "steps down" the voltage carried over distribution lines to the voltage level used by the customer (e.g., 120 volts for US systems). Example distribution transformers may include pole-mount transformers or pad-mount transformers. Other types of transformers are also available, such as consumer electronic device transformers (e.g., 120V AC to 12V DC or 5V DC).

Power in an electric circuit is the rate of flow of energy past a given point of the circuit. The portion of power that, averaged over a complete cycle of an alternating current (AC) waveform, results in net transfer of energy in one direction is known as real power (or active power), "P", and is measured in watts (W). The portion of power due to stored energy, which returns to the source in each cycle, is known as reactive power, "Q", which is measured in volt-amperes reactive (var or VAR). Said differently, in AC power, the voltage and current both vary approximately sinusoidally. When there is inductance or capacitance in the circuit, the voltage and current waveforms do not line up perfectly. The power flow has two components—the real/active power flows from source to load and can perform work at the load, the other portion, known as "reactive power" is due to the delay between voltage and current, known as phase angle, and cannot do useful work at the load.

Energy stored in capacitive or inductive elements of the network give rise to reactive power flow. Reactive power flow strongly influences the voltage levels across the network. Voltage levels and reactive power flow must be carefully controlled to allow a power system to be operated within acceptable limits. A technique known as "reactive compensation" can be used to reduce apparent power flow to a load by reducing reactive power supplied from transmission lines and providing it locally. For example, prior techniques may compensate an inductive load by installing a shunt capacitor close to the load itself. This allows all reactive power needed by the load to be supplied by the capacitor (e.g., to hit a target voltage, such as 118V), and not have to be transferred over the transmission lines. This practice alone does not save energy in a direct way, because reactive power does no work. But because the reactive component of the current is now only flowing locally, it is producing heat only in the local conductors and thus saving total energy.

A sinusoidally alternating voltage applied to a purely resistive load results in an alternating current that is fully in phase with the voltage. However, in many applications it is common for there to be a reactive component to the system, that is, the system possesses capacitance, inductance, or both. These electrical properties cause the current to change phase with respect to the voltage: capacitance tending the current to lead the voltage in phase, and inductance to lag it.

For sinusoid currents and voltages at the same frequency, reactive power in vars (or VARs) is the product of the voltage (V) and current (I) (e.g., RMS), or the apparent power, multiplied by the sine of φ (phi) (phase angle between the voltage and the current). The reactive power Q (the maximum value of the instantaneous power absorbed by the reactive component of the load) is given by:

$$Q=VI^*\sin(\phi) \qquad \text{Eq. 1,}$$

(notably, where I* is the complex conjugate of the current).

In power transmission, since most loads are inductive in nature, there is always reactive power present in the system. Since reactive power does not do any real work, the extra current supplied to provide the reactive power means greater line losses and high thermal limits for equipment too which translate to higher costs. Managing the reactive power flow in addition to real power flow becomes a very important task for operators to ensure voltage stability throughout the system. In general terms, decreasing a supply of reactive power to the system causes voltage to fall while increasing it causes voltage to rise.

As noted above, standards are often established that define recommended voltage ratings and operating tolerances, such as the ANSI standard that defines the service voltage at the point of delivery to be no more than plus or minus 5% of the nominal voltage (e.g., a 120-volt nominal system should not go below 114 volts or above 126 volts). As also noted above, conservation voltage reduction (CVR) is a method to improve the efficiency of electric sources, such as the electric power grid, by optimizing voltage on the feeders that supply electricity to end-use devices (e.g., optimizing voltage on the feeders that run from substations to customers), thus reducing energy consumption.

Traditional conservation of voltage methods within power grids have been performed by controlling a load tap changer (LTC) at the substation transformer (which in turn supplies energy to one or more connected distribution feeders and ultimately to downstream distribution service transformers and customers loads), and is limited to lowering the voltage of the connected distribution feeder(s) no lower than the lowest performing voltage point on the feeder(s). In particular, the voltage on a distribution feeder for a traditional utility power system is controlled by the LTC at the substation transformer, where the LTC shifts the voltage profile of the entire connected feeder(s) up or down. However, the LTC does not have the ability to manage individual low-voltage or high-voltage points along the path of the feeder. Thus, if the lowest performing voltage point on a distribution feeder is already near or at minus 5% of the nominal voltage, the opportunity to further lower the voltage across the entire feeder via traditional control of the substation transformer LTC is very limited or non-existent. While voltages at many or most other points along the controlled feeder may be operating at a higher voltage and could conceivably be lowered to reduce energy consumption, further voltage reduction by action of the LTC is constrained and not possible.

Traditionally, the power flow on the electric grid is unidirectional: the power flows from the utility generators down to the homes and businesses. The voltage profile of distribution feeders in the traditional power system 100 is illustrated in FIG. 1. As shown, the voltage 105 starts out high at the beginning of the feeder (substation transformer 110) and drops as power flows through cables 115, distribution transformers 120, and service wires 125 before reaching its customers 130. With the advances in distributed generation, e.g. solar rooftop photo-voltaic (PV) systems, power generation at homes and businesses have become quite prevalent, causing the flow of power to be bidirectional. The location and size of these distributed resources contribute to the voltage profile; there may now be higher voltages at the end of the feeder than the start. Also, due to the variability of these distributed resources the voltages can be very erratic. For example, in the case of a feeder with solar PV there will be two very different voltage profiles: one profile during the day while the sun is shining and the other during the night when solar PV does not generate power. Further, with the addition of solar PV, feeder voltages can vary and shift in very short (seconds) and random time intervals during the clay due to cloud shadows sweeping across PV arrays, in turn resulting in power production swings and erratic voltage fluctuations. As more distributed generation interconnects to the grid, it becomes increasingly difficult for utilities to effectively manage voltage variability and implement CVR with just the utility's LTC method of managing voltage.

In order to address the numerous issues noted above (e.g., variable loads in the grid, devices that produce power locally, lack of voltage control beyond the utility's LTC, etc.), the techniques herein define an algorithm and corresponding system to control the voltage on the electrical power grid by minimizing the voltage differential (e.g., drop, increase, and/or variation/fluctuation according to an expected voltage) across a transformer (e.g., a single-phase or three-phase distribution transformer, and the like) through a newly defined dynamic reactive compensation technique. That is, using the measurement of real and reactive power flow through a transformer, the amount of compensating reactive power may be computed in real time and is then either absorbed or produced on-demand in order to minimize the instantaneous effects of various loads and sources on the voltage at the transformer (and thus the variation/fluctuation, or difference in voltage over time). This method of voltage control is dynamic, automated, and is independent of circuit topology, location, and switching, where, notably, current methods of CVR via LTC control alone require a predefined voltage set-point.

Specifically, according to one or more embodiments of the present disclosure, a computing device determines (e.g., senses) real and reactive power flows at a transformer at a given time, and computes, based on the real power and reactive power flow at the transformer, an amount of reactive power adjustment to produce a desired voltage differential across the transformer. The computing device may then adjust the reactive power flow from a secondary side of the transformer at substantially the given time based on the computed amount.

As described in greater detail below, the desired voltage differential across the transformer may be based on the expected voltage transformation (e.g., a ratio of windings used to produce a desired result, such as, e.g., 12 kV stepping down to 240V or 120V, or 12V stepping down to 5V, etc.), and may correspondingly be based on a voltage differential across the transformer substantially equal to zero, or other desired voltages (e.g., a desired drop or increase, as described herein). That is, voltage differential (drop or increase as compared to an expected value based on the transformer's intent/design) may be based on any number of factors, such as the impedance of the transformer (or other components). Accordingly, the desired voltage differential may be based on accounting for these differences to achieve any correspondingly desired result. For example, as detailed below, adjusting (dispatching) the reactive power flow may comprise producing (exporting) reactive power, and/or absorbing (importing) reactive power, in order to bring the voltage differential across the transformer, whether at the secondary side or primary side of the transformer, to a desired level, generally counteracting the downstream (or in some cases, upstream) effects of the power profile.

In particular, with the techniques herein, various additional embodiments may take advantage of the controlled voltage, where variability for both low-voltage conditions (e.g., because of variable load) and high-voltage conditions (e.g., because of variable power inputs) can be controlled. For instance, one particular embodiment may expand on the dynamic reactive compensation techniques herein by applying them to conservation voltage reduction (CVR) systems, where the smoothed-out voltage variability now allows for deeper reduction of the overall voltage of a feeder line, since the voltage available at the first, intermediate and last components along the feeder run may now be substantially similar (or at least closer), and may thus be collectively lowered an even greater amount. (Other embodiments and advantages may be described below, and CVR-specific implementations are not meant to limit the scope of the dynamic reactive compensation techniques described herein.)

Operationally, the techniques herein provide a dynamic reactive compensation device (e.g., a computing device, generally comprising of one or more control algorithms, sensing circuitry, reactive dispatch (production/absorption) circuitry, and so on, as described in greater detail below), which minimizes the voltage differential (e.g., the drop, increase, and/or the variation in voltage) at the distribution transformer. For example, as shown above in FIG. 1, the voltage dips (and rises) along the feeder profile (voltage 105) may be specifically addressed by the techniques herein, including not only the transformer drops, but also the line losses along the feeder line. That is, every segment of a power circuit creates some amount of voltage differential across that segment, based on impedance of that segment along the line, real/reactive load characteristics, and so on. A significant component of voltage differential occurs on each distribution transformer, so the illustrative location of the computing device is at one or more of the corresponding distribution transformers.

The basis of the dynamic reactive compensation algorithm herein is based on the theory of voltage drop along a component on a circuit, where control of reactive power flow has a material effect on managing the voltage drop. Generally, the voltage drop across a single-phase transformer can be approximated by:

$$\Delta V = \frac{\sqrt{P^2 + Q^2}}{kV} * (R * \cos\theta + X * \sin\theta), \quad \text{Eq. 2}$$

where:
 R=Resistance of component;
 X=Reactance of component;
 P=Real power flow through the transformer (current is in phase with the voltage);
 Q=Reactive power flow through the transformer (current 90 degrees out of phase with the voltage); and
 θ=Angle between the voltage and current.
(Note that for a three-phase transformer, other specific equations may be computed as may be understood by those skilled in the art, such as, e.g., where ΔV=sqrt(3) times the value above, and the equations herein are merely examples.) In theory, the voltage difference across a transformer is zero when:

$$Q = -\frac{R}{X} * P. \quad \text{Eq. 3}$$

Thus, by matching the reactive power to a negative ratio of the real power flow through the transformer, the voltage differential is minimized.

Figure 2:
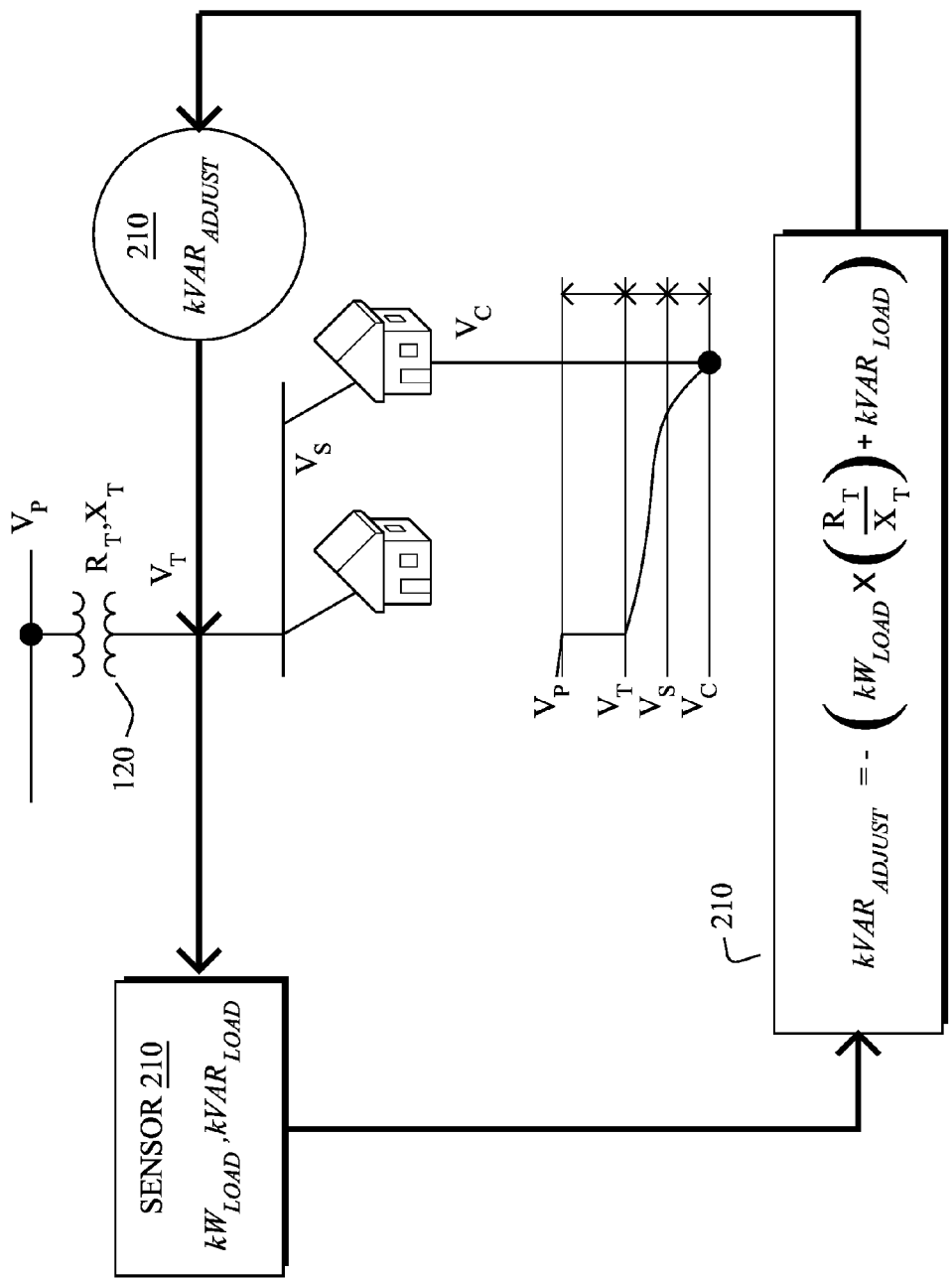
FIG. 2 illustrates an example feedback loop for dynamic reactive compensation.

An example implementation of the algorithm is illustrated in FIG. 2, showing a sub-view of FIG. 1. The illustrative device 210 (shown logically as a feedback loop), may be placed at or near the transformer 120, and measures the power flow through the transformer and computes the amount of VARs required to offset the voltage difference, $kVAR_{ADJUST}$, using the following equation, which is also shown in FIG. 2:

$$kVAR_{ADJUST} = -\left(kW_{LOAD} \times \left(\frac{R_T}{X_T}\right) + kVAR_{LOAD}\right), \quad \text{Eq. 4}$$

where:
 $kW_{LOAD}$ is the real power flow through the secondary side of a transformer (also "P");
 $kVAR_{LOAD}$ is the reactive power flow through the secondary side of the transformer (also "Q") (i.e., the kVAR demand required downstream of the distribution transformer);

$R_T$ is the resistance of the transformer; and $X_T$ is the reactance of the transformer.

Note that $kVAR_{ADJUST}$ may also be described as "$kVAR_{DISPATCH}$" to produce VARs or to absorb VARs if need be. As such, "$kVAR_{ADJUST}$" may thus be used herein to represent the amount of adjustment required to reach the desired voltage differential across the transformer, whether through producing or absorbing, according to the techniques herein. In particular, when VARs are produced, it reduces the reactive power demand from the substation. Conversely when VARs are absorbed by the device, it reduces the increase in voltage experienced on the secondary side of the transformer due to distributed generation. The ability to push and pull VARs can significantly reduce the voltage fluctuations and flatten the voltage profile along a feeder. (Note that R may be larger than X, requiring more reactive power dispatch than the real power load, but there are times when X is larger than R, thus requiring less reactive power dispatch than the real power load. Each system is different, and in fact, there may be multiple sources of R and X (e.g. transformers in series), and as such, the ratio may be $(R_1+R_n)/(X_1+X_n)$, along with other factors related to the actual effect of a particular R and/or X.)

The equation Eq. 4 above is merely one example, and other specific equations may be used. The negative sign in front of the equation suggests that the $kVAR_{ADJUST}$ adjustment counteracts the cause of the voltage differential/variability. For example, when the sum of the real power flow/load and reactive power flow/load is positive (i.e., using/drawing power from the system), the voltage at the secondary side of the transformer drops, accordingly. As such, a negative $kVAR_{ADJUST}$ results in requiring dispatching (injecting) VARs into the system in order to balance it, which would correspondingly reduce the voltage differential across the transformer, e.g., to substantially zero. Conversely, when the sum of the real power flow and reactive power flow (i.e., load) is negative (e.g., charging/supplying power to the system), the voltage at the secondary side of the transformer increases, accordingly. As such, a positive $kVAR_{ADJUST}$ results in requiring dispatching (absorbing) VARs from the system in order to balance it, which would correspondingly reduce the voltage differential across the transformer, e.g., again to substantially zero (thus preventing over-voltage conditions). Over time, such $kVAR_{ADJUST}$ adjustments stabilize the voltage fluctuations in the system, whether due to changes in load, changes in supply, or both.

Figure 3A:
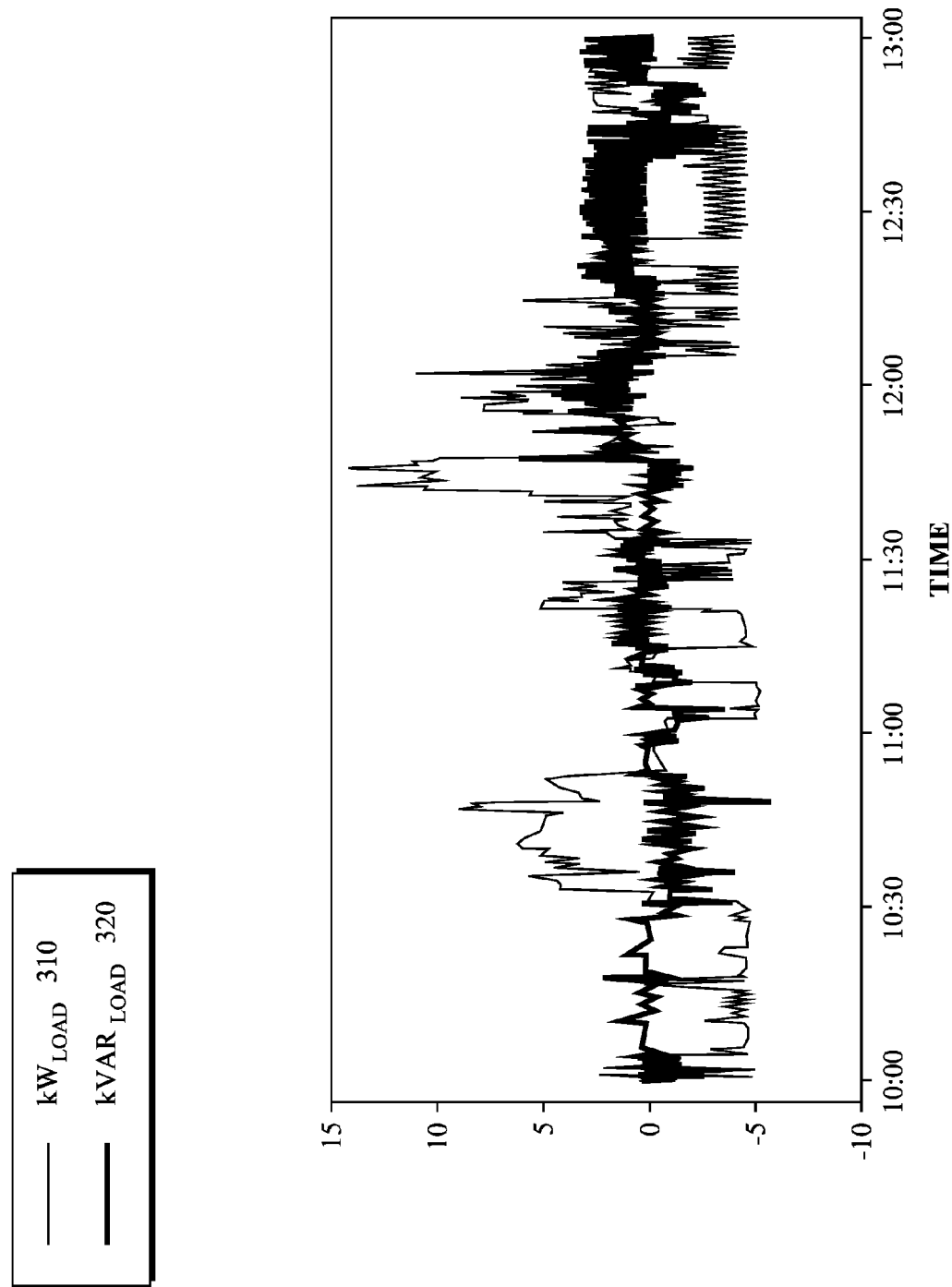
FIGS. 3A-3D illustrate example voltage-based plots according to dynamic reactive compensation.
Figure 3B:
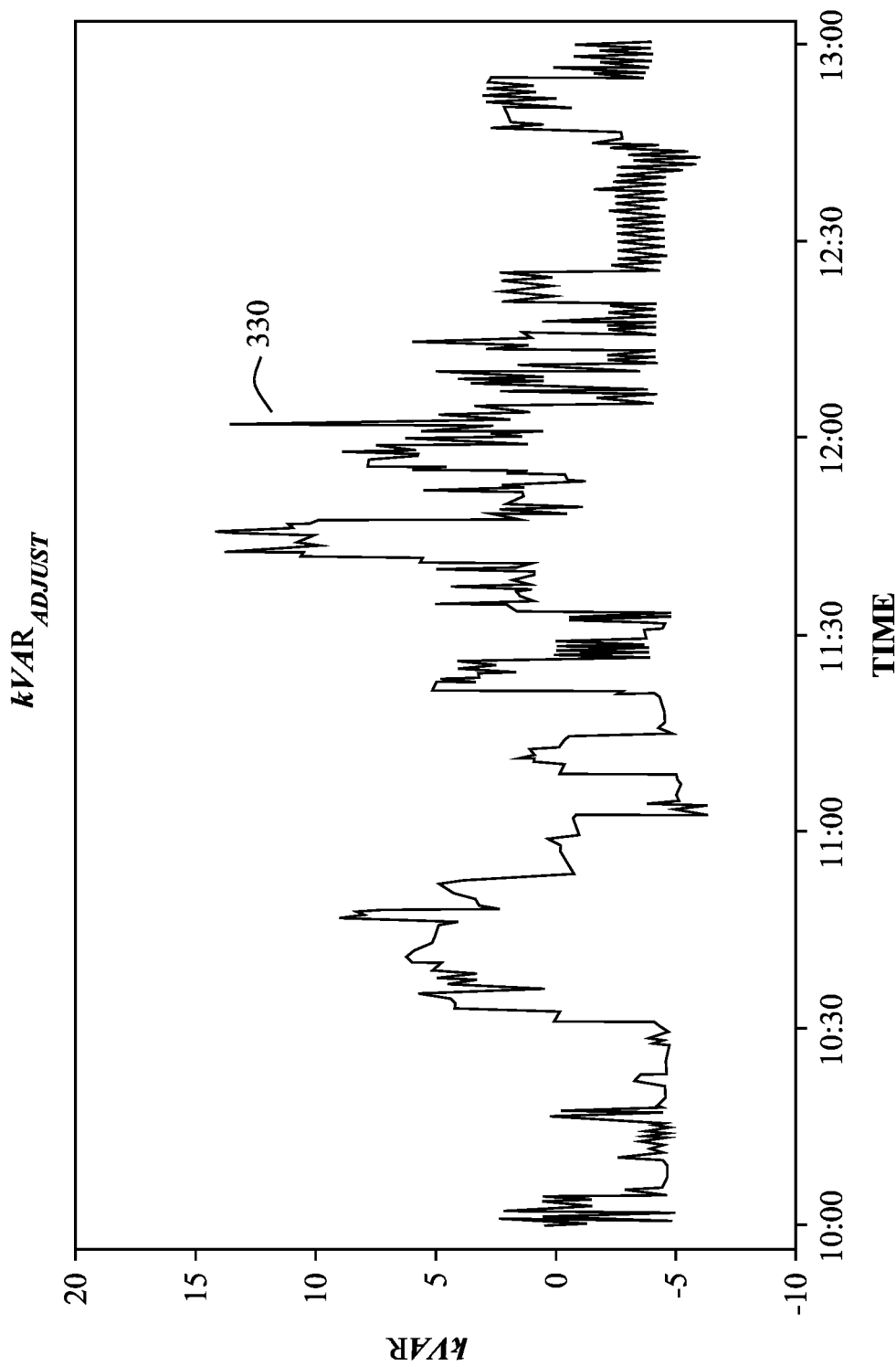
Figure 3C:
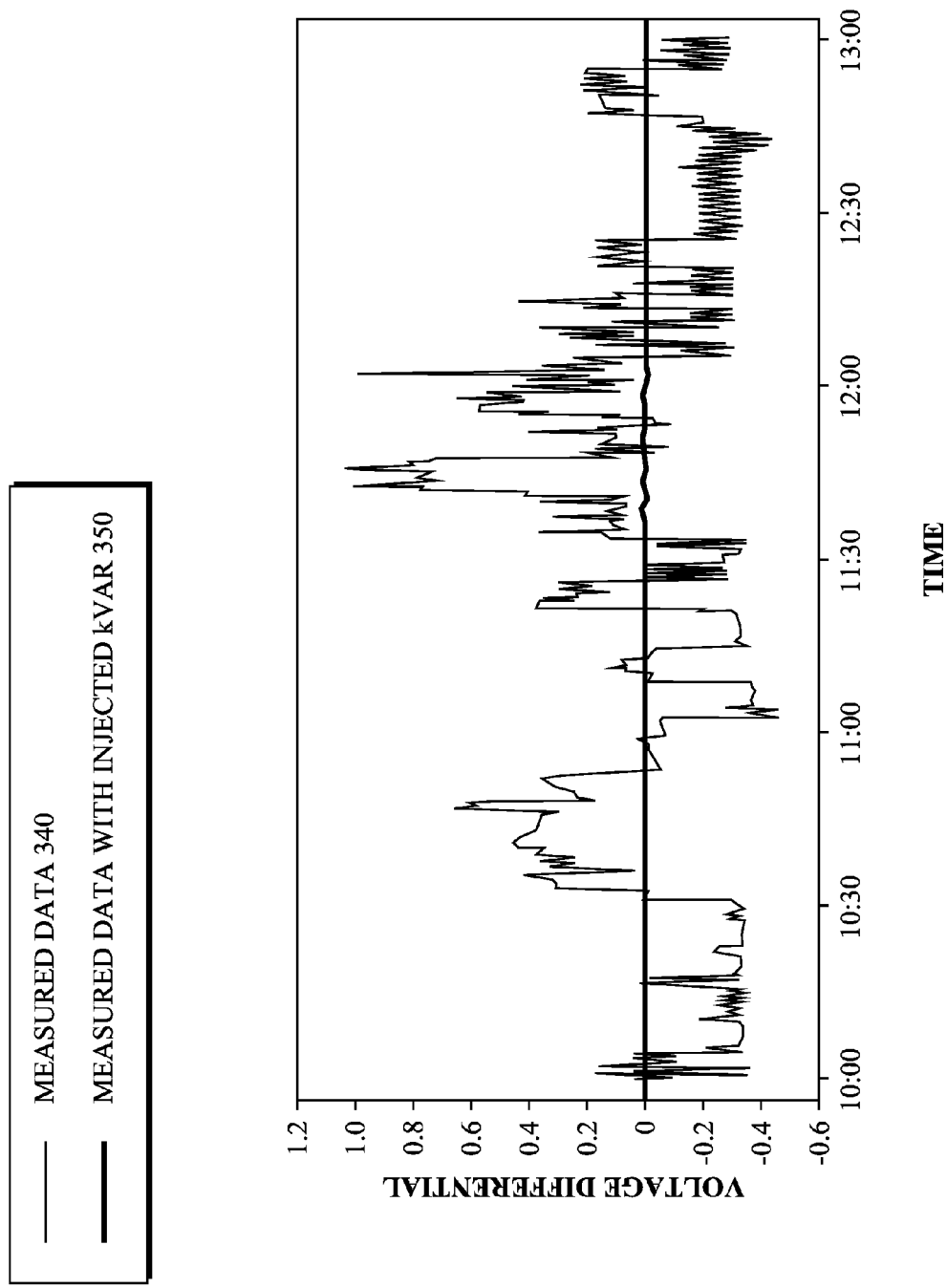
Figure 3D:
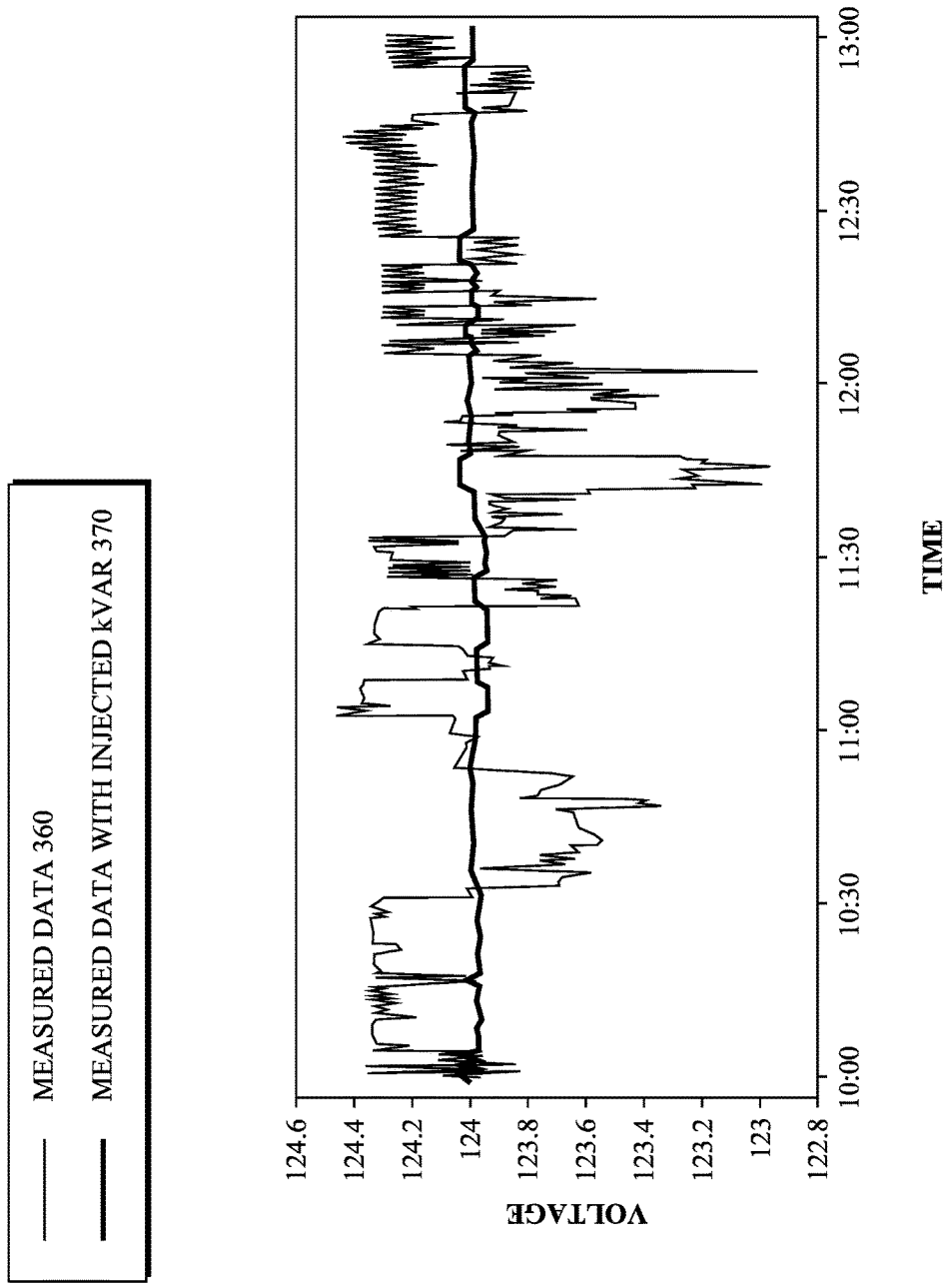

An example effect of the dynamic reactive compensation techniques herein is shown in FIGS. 3A-3D. In particular, FIG. 3A illustrates a plot of $kW_{LOAD}$ 310 and $kVAR_{LOAD}$ 320 taken over a given time period (e.g., three hours), with both draw (positive loads) and sourcing of power (negative loads). As then shown in FIG. 3B, the corresponding $kVAR_{ADJUST}$ value 330 is shown over time, illustratively based on the Equation Eq. 4 above. FIG. 3C illustrates the original voltage differential value 340 (drops as negative values, increases as positive values) over that time without the dynamic reactive compensation herein (with a maximum ΔV of approximately 1.45V), while the adjusted voltage differential value 350 is shown over that time to be substantially minimized in accordance with the dynamic reactive compensation herein (with a maximum ΔV of approximately 0.018V). Further, FIG. 3D illustrates the actual voltage measurement at the secondary side of the transformer, where plot 360 represents the voltage measurements collected at a distribution service transformer. As illustrated, there are large voltage variations of up to 1.68 volts in a span of three hours. Plot 370, on the other hand, represents the voltage with the implementation of the dynamic reactive compensation algorithm herein, where, as shown, the algorithm significantly reduces the voltage fluctuations (hovering around 124 volts).

In one embodiment, standard meters may be used for measuring the power flow through a transformer. However, according to one specific embodiment herein (e.g., a lower-cost option) is to obtain measurements for the voltage (V) and current (I). The real and reactive power can then be computed using any suitable equations, such as, e.g., the following illustrative equations:

$$kW=\text{real}(V \cdot I^*) \qquad \text{Eq. 5,}$$

$$kVar=\text{imag}(V \cdot I^*) \qquad \text{Eq. 6,}$$

where I* is the complex conjugate of the current. The voltage and current may be metered directly within the computing device, and/or metered from a plurality of locations. (Illustratively, a short range local communication may be utilized at each monitoring site to transmit the data to an aggregator, where each aggregator is capable of accepting and storing data from several sensors, and is responsible for transmitting the data to a remote location via cellular communication and/or other methods.)

Notably, the techniques herein require the knowledge of the transformer resistance (R) and reactance (X). In practice, the impedance (Z) of a transformer is not always available. The relationship is given by:

$$Z=\sqrt{R^2+X^2} \qquad \text{Eq. 7.}$$

Figure 4:
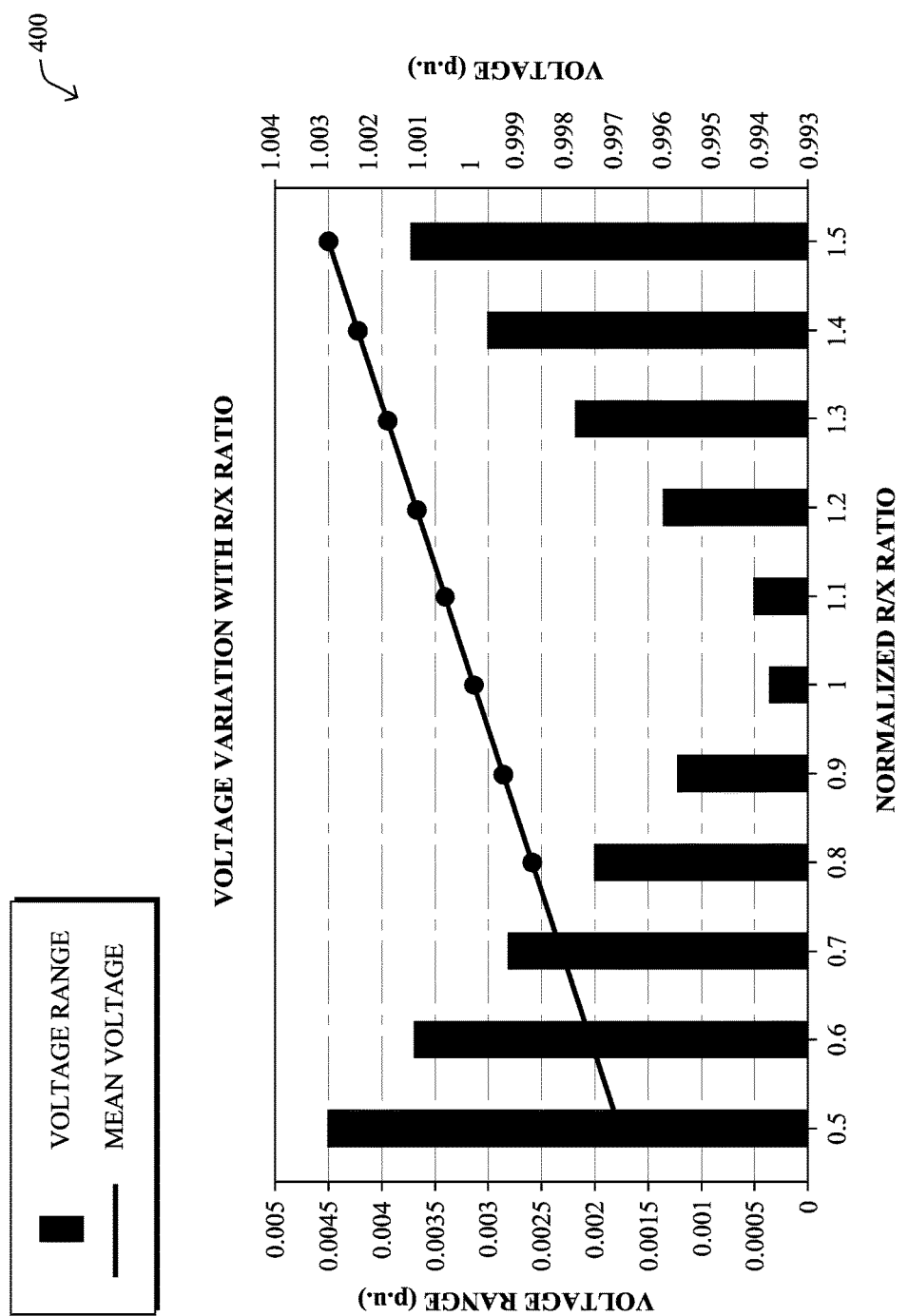
FIG. 4 illustrates an example chart of voltage variation according to a resistance/reactance ratio.

A sensitivity analysis, as shown in FIG. 4 represents actual field-collected data to determine the performance of the dynamic reactive compensation algorithm for errors in the transformer impedance. The normalized R/X ratio on the horizontal axis represents the error made in the assumption of the R/X ratio. For example, a value of 1.1 equates to a value that is 10% larger than the actual amount. The voltage range (p.u.) is computed as the difference between the maximum voltage difference and the minimum voltage difference on a 120 volt base using the equation below:

$$\text{Voltage Range } (p.u.) = \frac{\Delta V_{max} - \Delta V_{min}}{120}, \qquad \text{Eq. 8}$$

where ΔVmax is the largest voltage differential between the primary and secondary side of the transformer on a 120-volt basis. Similarly, ΔVmin is the minimum voltage differential between the primary and secondary side of the transformer on a 120-volt basis.

As illustrated in the graph 400 of FIG. 4, the mean voltage increases linearly as a function of the R/X ratio. This is expected since the R/X ratio determines how much reactive power is transferred. As the amount of VAR export increases, the voltage increases. To examine the ability to reduce voltage fluctuations, the bar plot shows that assuming a larger R/X ratio provides better results as compared to a smaller value. (In one embodiment, impedance of the transformer may actually be determined numerically based on a computation using voltage and current measurements.)

According to one or more particular embodiments herein, the dynamic reactive compensation techniques herein may be distributed (decomposed) into a "steady" and "highly variable" power flow control. For instance, the techniques herein may compute the amount of reactive power required to minimize the voltage difference across a service transformer using equation Eq. 4 above. The reactive power can be provided using the device itself as well as (or alternatively from) other distributed VAR resources, thereby eliminating the need for it to come from the electric utility. The computing device is illustratively a fast-acting device that can shift reactive power quickly, such as in a 1-2 second time interval. Other available distributed VAR resources may be equally as responsive, or else may be limited to slow response times due to the device capability as well as communication limitations. When slower remote VAR resources are used in conjunction with the local high-speed device, the techniques herein provide the ability to decompose the VAR load into a slow-varying ("steady") component which can be served from the slower distributed resources, and a highly variable component that can be supported by the fast-acting local computing device.

Figure 5:
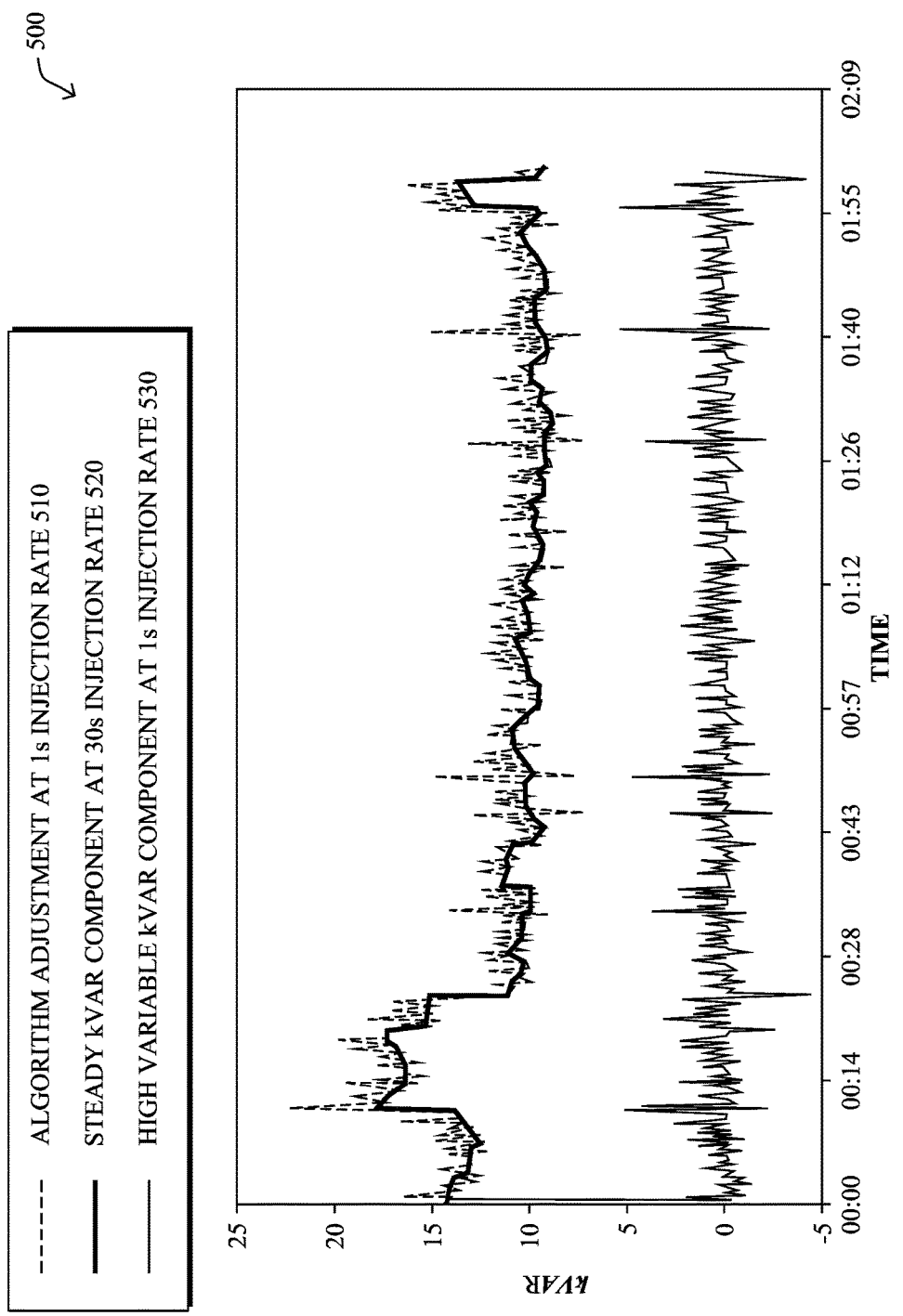
FIG. 5 illustrates an example of decomposing dynamic reactive compensation between slow-reacting and fast-reacting reactive compensation.

FIG. 5 illustrates an example plot 500 of reactive power as a function of time for demonstrating the power flow decomposition mentioned above. For instance, line 510 is the baseline which shows the required amount of reactive power needed to minimize the voltage difference as calculated by the dynamic reactive compensation algorithm herein. A low-pass filter may then be used to decompose the required reactive power 510 into a steady kVAR component (line 520, e.g., at a 30 s injection rate), and highly variable component (line 530, e.g., at a is injection rate). In other words, as shown, the techniques herein may use a slower compensation component, whether local or remote to device 210, and the high-speed component (generally local to device 210) makes up for the difference during the slower reaction time (i.e., component 520 plus component 530, at any given time, equals the required reactive power 510).

Figure 6:
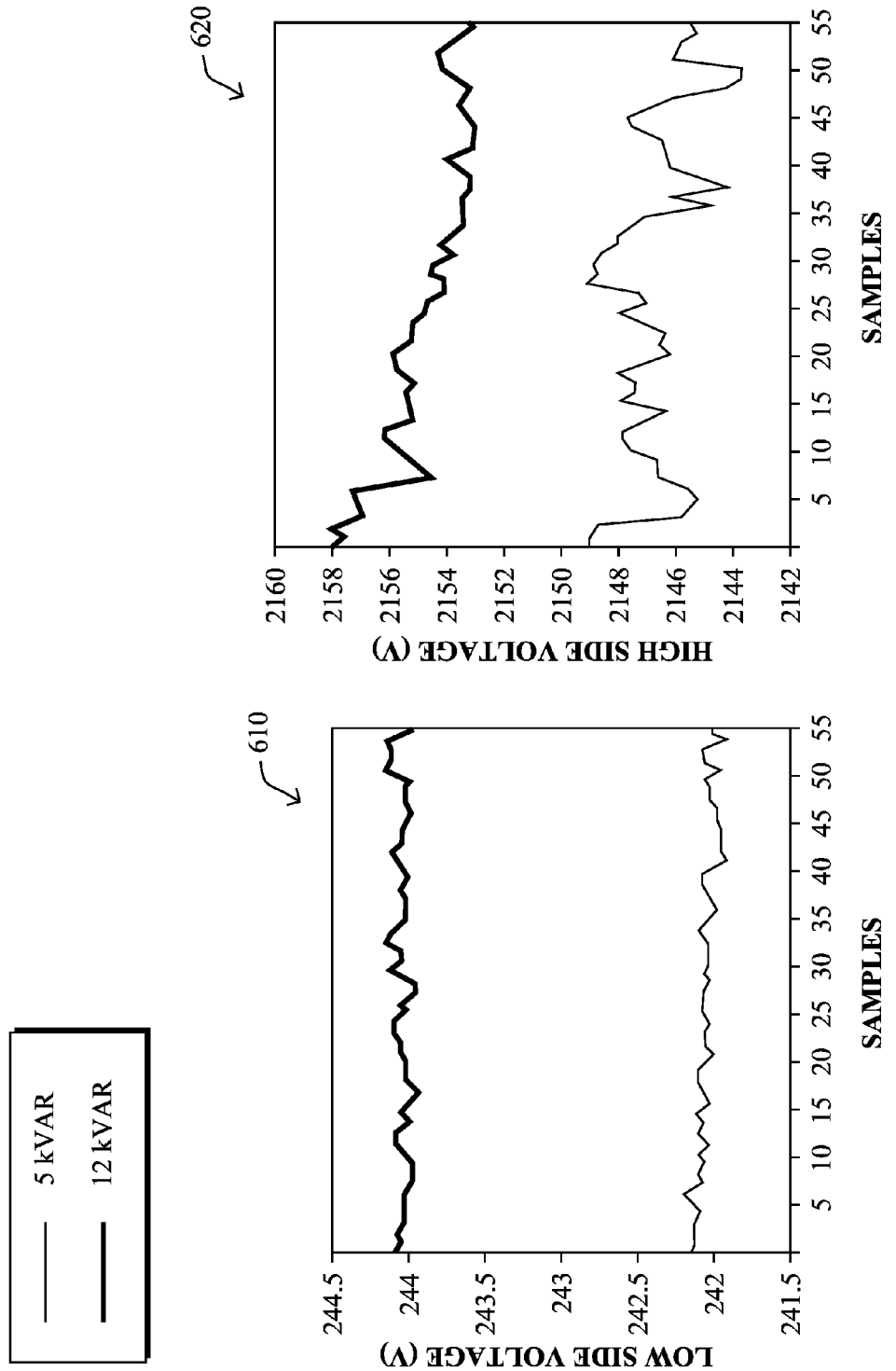
FIG. 6 illustrates an example of an effect of dynamic reactive compensation on high-side voltage of a transformer.
Figure 7:
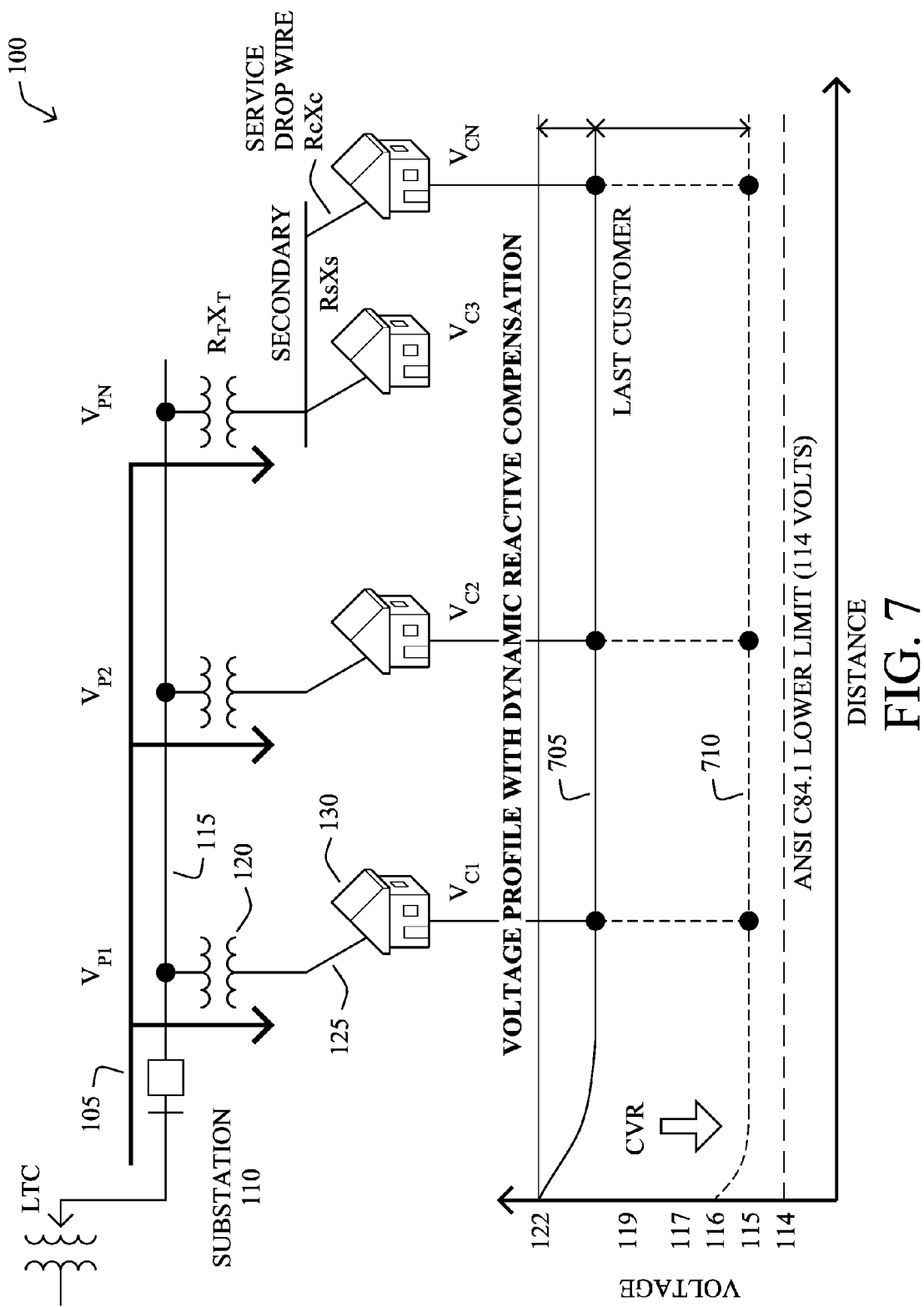
FIG. 7 illustrates an example of an adjusted voltage profile along a power grid feeder line according to dynamic reactive compensation.

According to one or more additional embodiments herein, the techniques herein may also be used to maintain a relatively constant voltage along the entire feeder path. That is, the solution above addresses the voltage difference across distribution transformers, which can greatly enhance voltage management. However, the voltage along the feeder can still vary due to losses along the 12 kV conductor. To counteract the voltage drop due to line loss, additional reactive power can be injected on the low-side of the transformer so that it induces an increase in voltage on the primary side. Another option is to deploy reactive power devices strategically along the feeder. FIG. 6 illustrates the measured ability of injected kVAR to affect the low-side voltage (plot 610) as well as the high-side voltage (plot 620) of a transformer (e.g., adding a fixed reactive power adjustment to bias the voltage differential across the transformer). Accordingly, by using the techniques herein to add supplemental voltage to the high-side of the transformer (e.g., adjusting the voltage differential to an actual voltage gain), then as shown in FIG. 7, a more "flat" voltage profile 705 can be achieved from head-end to tail-end of a distribution feeder. In this manner, the ability to perform conservation voltage reduction (CVR) techniques is further enhanced, since the tail-end (end-point) has a substantially similar voltage starting point as the head-end (thus using an LTC dial to effectively turn everyone's voltage down to a minimum acceptable level, shown as profile 710).

Figure 8:
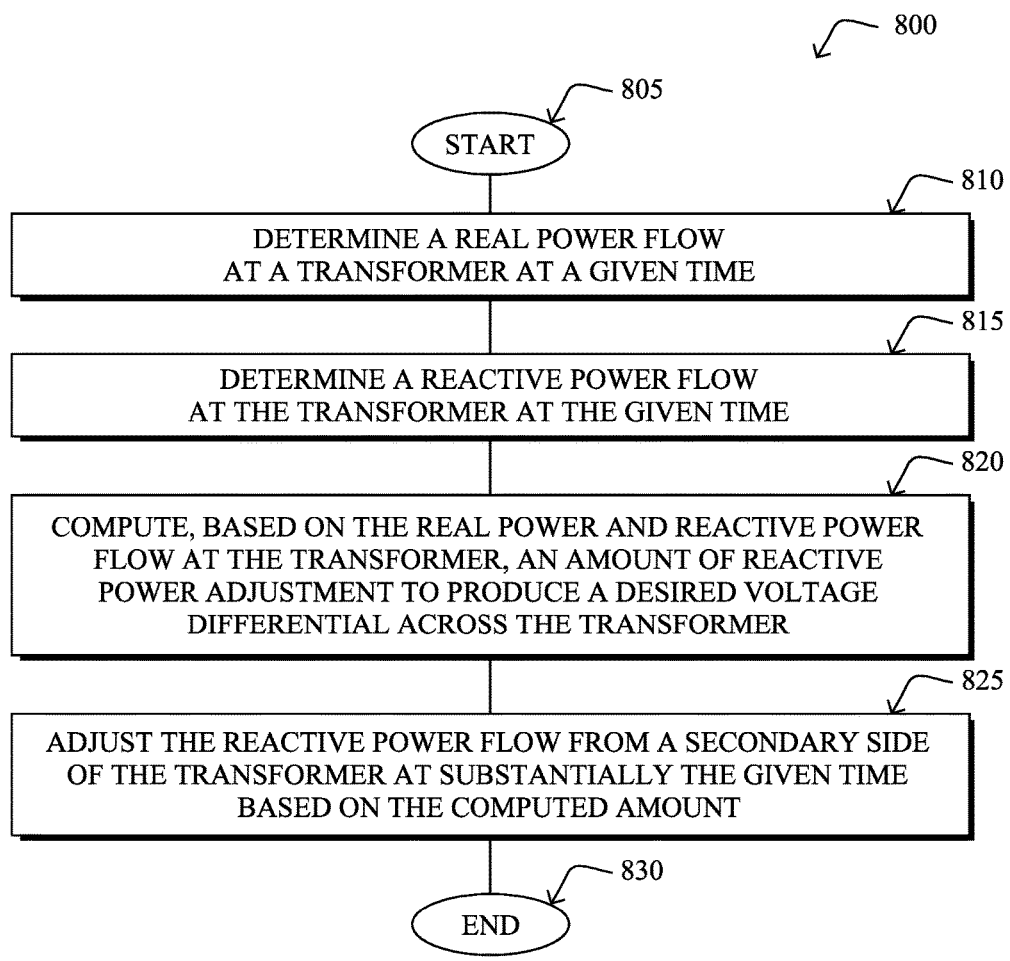
FIG. 8 illustrates an example simplified procedure for dynamic reactive compensation.

To reiterate, generally, the techniques described above, FIG. 8 illustrates an example simplified procedure for dynamic reactive compensation in accordance with one or more embodiments described herein. For example, a non-generic, specifically configured device 210 (e.g., a computing device or controller) may perform procedure 800 by executing stored instructions (e.g., a process stored in memory or as configuration of a microprocessor). The procedure 800 may start at step 805, and continues to steps 810 and 815 (simultaneously or in any desired order), where, as described in greater detail above, a computing device determines (e.g., senses or computes) both a real and reactive power flow through a transformer at a given time. In certain embodiments, various specifically designed sensors for real power and reactive power may be used. In one particular embodiment mentioned above, determining the real and reactive power flow through the transformer may comprise first sensing voltage (V) and current (I) at the secondary side of the transformer, and then computing the real power (P) as a real component of the product of the voltage and a complex conjugate of the current (i.e., P=real (V·I*)), and the reactive power (Q) as an imaginary component of the product of the voltage and the complex conjugate of the current (i.e., Q=imag(V·I*)).

In step 820, the computing device may compute, based on the real power and reactive power flow at the transformer, an amount of reactive power adjustment in order to produce a desired voltage differential across the transformer. For instance, the desired voltage differential may be zero (minimized voltage differential), or non-zero (controlled voltage level), such as being less than zero to raise the voltage, or greater than zero to reduce the voltage. For example, when the transformer is one of a plurality of transformers along a feeder line, then the desired voltage differential across each particular transformer may be specifically based on accounting for feeder line impedance between the plurality of transformers along the feeder line, in order to produce substantially the same voltage output on corresponding secondary sides of the plurality of transformers. In other words, each transformer on the feeder line may have a different amount of adjustment in order to compensate for feeder line losses (e.g., a voltage increase to drive the high-side voltage higher), rather than merely accounting for individual transformer voltage differential. Other reasons for boosting/adding a fixed reactive power adjustment to compensate for the transformer impedance are feasible, and those mentioned herein are not meant to limit the scope of the present disclosure.

As described above, one illustrative computation of the amount of reactive power adjustment to produce the desired voltage differential across the transformer is to set the amount substantially equal to: a negative of (the real power flow at a transformer times a multiplier, plus the reactive power flow through the transformer) (and optionally, plus an added bias, as mentioned above). That is:

$$VAR_{ADJUST} = -(W_{LOAD} \times M + VAR_{LOAD}) \qquad \text{Eq. 9,}$$

where M is the multiplier. As noted above, the multiplier may be computed in one embodiment as a ratio of a resistance of the transformer ($R_T$) to a reactance of the transformer ($X_T$), thus $R_T/X_T$. As also noted above, since these values (e.g., the impedance) of the transformer may not always be known, the techniques herein may determine at least one or both of the resistance of the transformer and the reactance of the transformer based on actual measurements performed by the computing device on the transformer. In still another embodiment, the multiplier M may be based on an assumed ratio of the resistance of the transformer to a reactance of the transformer. For instance, through experimentation as described above, an assumed ratio may be selected as the multiplier in order to produce generally desirable results (e.g., where the assumed ratio may be greater than or less than 1, as mentioned above). Notably, for either an actual ratio, measured ratio, or assumed ratio, the techniques herein may further adjust the multiplier to account for additional service wires from the transformer (e.g., increasing or decreasing the multiplier, accordingly).

In step 825, the techniques herein may then adjust (e.g., produce or absorb) the reactive power flow from the secondary side of the transformer at substantially the given time based on the computed amount. As described above, the adjusting of the reactive power may be based on controlling circuitry local to the computing device, or else directing circuitry on a remote device. An example of circuitry capable of adjusting reactive power is controlled inverter circuitry, though other suitable types of power electronic circuitry capable of producing and absorbing reactive power may be used. Notably, as mentioned above, adjusting at "substantially the given time" is meant, in certain embodiments, to mean quickly, such as, e.g., occurring within five seconds of the given time, or more particularly as described above, within 1-2 seconds of the sensed real and reactive power flows. Note further that the adjustment may have both a local/fast component and a remote/slow component. That is, as described above, adjusting may comprise controlling circuitry local to the computing device at substantially the given time, as well as directing circuitry on a remote device to adjust reactive power (e.g., optionally at a slower response rate than the circuitry local to the computing device), where the reactive power adjustment by both the circuitry local to the computing device and the circuitry on the remote device combine to produce the desired voltage differential across the transformer.

The procedure illustratively ends in step 830, though notably with the ability to determine/sense, compute, and adjust over time (i.e., repeating procedure 800) to reduce fluctuations in voltage at the secondary side of the transformer over time.

Note that in one additional embodiment, a voltage difference band, $V_{BAND}$, may be defined as a user-adjustable parameter that can be used to determine if the reactive power adjustment needs to be recomputed and readjusted (that is, whether and when procedure 800 should repeat). For instance, though the procedure 800 above first calculates the amount of reactive power required to produce a desired voltage differential across the transformer, after the reactive power is adjusted (e.g., produced or absorbed), there are two values that may be saved and used as reference points:

1) The reactive power that was adjusted (produced or absorbed), and
2) The voltage on the secondary side of the transformer, $V_{REF}$.

At the next time instant, the voltage on the secondary side of the transformer, $V_{SEC}$ may then be sensed and compared to $V_{REF}$ to determine if reactive power adjustment needs to be recomputed or maintained, which is shown by the following equation:

$$V_{DIFF} = abs(V_{SEC} - V_{REF})\qquad\text{Eq. 10.}$$

If the computed value of $V_{DIFF}$ is less than the user input parameter $V_{BAND}$, this means that the voltage may be maintained within the desired tolerance and the reactive power adjustment can be maintained. Conversely, if the value of $V_{DIFF}$ is greater than the user input parameter $V_{BAND}$, this means that the voltage at the current time instant is outside the desired band of fluctuation and thus the reactive power adjustment needs to be recomputed using the real and reactive power flow through the transformer. The reactive power reference and voltage reference values are then updated to reflect the new values. In this manner, the use of the "dead band parameter" herein allows flexibility in maintaining voltage within a certain band. Said differently, the techniques herein may maintain the adjustment over time in response to the fluctuations in voltage remaining within a specified band of acceptable voltage change, and may correspondingly sense, compute, and adjust in response to the fluctuations in voltage falling outside the specified band of acceptable voltage change at any particular time.

In addition, though the procedure is simplified to address the dynamic reactive compensation portion of the embodiments herein, the present disclosure specifically contemplates the application of conservation voltage reduction (CVR) based on the dynamic reactive compensation to even more greatly improve the efficiency of electric sources (e.g., the electric power grid) and reducing overall energy consumption. For instance, as noted above, traditional conservation of voltage methods within power grids have been performed by controlling load tap changers (LTCs), which are limited to lowering the voltage to the worst performing customer/voltage point on a feeder (e.g., reducing it to 122 volts on the substation transformer secondary side as shown above in FIG. 1, in order to prevent the last end-point from dropping below 114 volts (e.g., 115 volts as shown to be safe) at the lowest point). However, since each individual end-point can now have the voltage drop mitigated, and in certain embodiments the feeder line voltage on the primary side of the transformer may also be raised to account for the line losses, CVR may be applied to even more conserving levels, reducing overall voltage to an even lower level since all end-points can be maintained at the lowest rate (e.g., reducing it to, say 120 volts on the substation transformer secondary side instead of 122 volts, a nearly 2% reduction in overall power, where still none of the end-points would drop below the minimum compliant voltage level).

It should be noted that while certain steps within the simplified procedure 800 may be optional as described above, the steps shown in FIG. 8 are merely examples for illustration, and certain other functions may be included or excluded as desired, and certain details mentioned herein may be performed within certain steps, across multiple steps, or in steps not specifically shown for clarity. Further, while a particular order of the steps is shown, this ordering is merely illustrative, and any suitable arrangement of the steps may be utilized without departing from the scope of the embodiments herein.

The techniques described herein, therefore, provide for dynamic reactive compensation. In particular, the techniques herein adjust (produce and/or absorb) reactive power (vars) to compensate for the real power (watts) and reactive power induced voltage differential across a transformer (e.g., a distribution transformer plus any secondary and service wire conductors). Rather than merely taking a reading of voltage, the techniques herein may use impedance, watts, and vars to determine the appropriate amount of reactive power to absorb/sink (or add) to achieve a desired voltage differential across the transformer. The offsetting of the voltage differential as described herein provides a more granular control over variations in voltage along a feeder line and due to different loads (or sources) attached to the feeder line, allowing the system to increase/decrease voltage, provide visibility to grid issues, and manage reactive power demand. Notably, the techniques herein also compensate for neighboring end-points (e.g., next-door neighbors) that add power to the system, where in the past, if left un-mitigated, a neighboring power source could result in a higher voltage at someone else's power meter, thereby increasing the metered value, and thus the electric bill, of that someone else.

Additionally, in accordance with one specific embodiment of the present disclosure, the techniques herein may be particularly beneficial for conservation voltage reduction (CVR). For instance, as mentioned above, rather than being limited by the lowest voltage point on a feeder line (e.g., the furthest end point connection), the techniques herein provide dynamic reactive compensation devices that are downstream from the substation, and that can compensate for low voltage points. Once the low voltage end-points are more in-line with (similar voltage to) the rest of the feeder, then the grid controls (e.g., an LTC/knob) can be dialed to turn the overall voltage down even further, since the previously low voltage end point now has further to go before reaching a non-compliant state (e.g., no less than 114 volts for a 120-volt system with a 5% compliance requirement). The overall energy reduction (and reduction in demand) could thus prevent losses in the system, and may save energy resources and costs (e.g., saving $10 M annually with a mere 2% system-wide energy reduction). Previous devices have been used to monitor voltage levels directly at the end-points (e.g., houses), allowing the main transformers to be adjusted as low as they can without bringing any end-point out of compliance, but this does not address the mitigation of the individual voltage differentials across the distribution transformers, such as the mitigation provided by the techniques herein.

While there have been shown and described illustrative embodiments that provide for dynamic reactive compensation, it is to be understood that various other adaptations and modifications may be made within the spirit and scope of the embodiments herein. For example, while certain embodiments are described herein with respect to conservation voltage reduction (CVR), the dynamic reactive compensation techniques herein are not so limited, and may be used for other purposes, whether more simplistic (e.g., power factor correction, reactive load compensation, and reducing losses) or more complicated. Also, while dynamic reactive compensation is described as a singular component affecting voltage levels at a transformer, other components, such as Volt-VAR Optimization (VVO), other inverter-based techniques, etc., may be used in conjunction with dynamic reactive compensation. Further, though the techniques herein produce or absorb reactive power to manage voltage, power grids may evolve and communication to various distributed resources may become available, such that controlling both the real and reactive power can be implemented for a better cost-benefit ratio. Moreover, while the techniques described above are generally related to power grids, and particularly to distribution transformers (or in some examples substation transformers), the embodiments herein may be applied to any type of transformer that would benefit from dynamic reactive compensation.

Regarding the hardware design of the dynamic reactive compensation computing device 210, any suitable device or collection of devices may be appropriately designed to perform the functionality herein. In particular, the required functions of the device 210 are as follows:

Measure the real and reactive power at a transformer;
Compute the amount of reactive power to adjust (produce or absorb) to achieve a desired voltage differential across a transformer (to the desired voltage profile/level); and
Adjust (produce or absorb) reactive power from a secondary side of a transformer (or other types of devices).
Optional features may include:
Data logging;
Communication to remote devices for active control;
Input ports for commercial sensors, i.e. primary side voltage; and
Other features as deemed useful by specific implementations and designs.

Generally, therefore, any appropriately configured device or collection of devices may be designed to adjust reactive power at key strategic nodal points in an electrical system (e.g., power grid) according to real-time measurements, such as a single device with sensors, control, and power electronics (e.g., inverters configured to produce and/or absorb reactive power), a controller separate from a collection of power electronic devices, a controller that receives remotely sensed measurements, various edge devices/fog computing/Internet of Things (IoT) devices, and so on.

Illustratively, therefore, the techniques described herein may be performed by hardware, software, and/or firmware, and any combination thereof. In particular, the dynamic reactive compensation device 210, or any other computing device shown and described above, may be configured to execute one or more processes that may include computer executable instructions executed by a processor to perform functions relating to the techniques described herein. For instance, it is expressly contemplated that the components and/or elements described herein can be implemented as software being stored on a tangible (non-transitory) computer-readable medium (e.g., disks, CDs, RAM, EEPROM, etc.) having program instructions executing on a computer, hardware, firmware, or a combination thereof.

Figure 9:
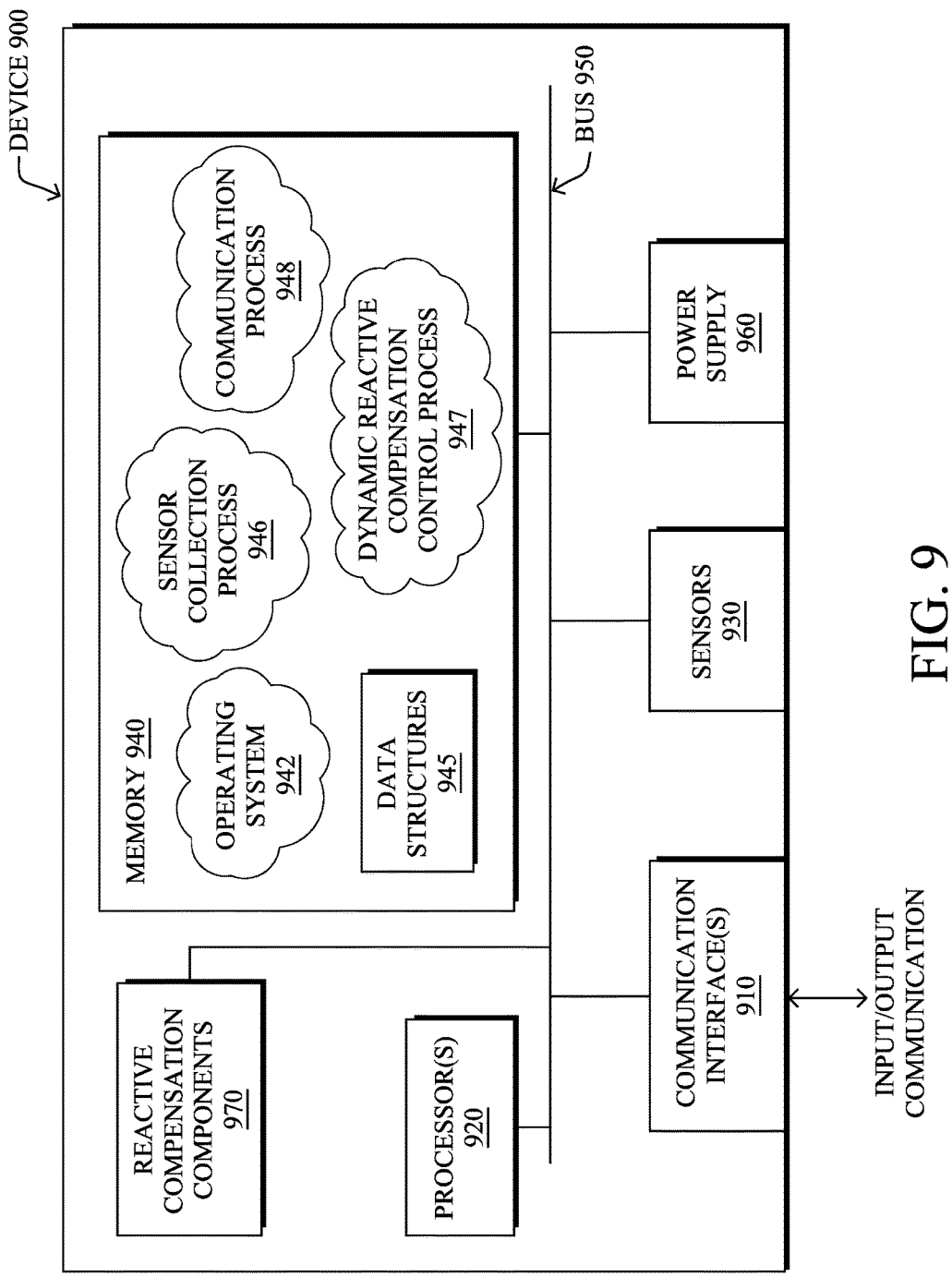
FIG. 9 illustrates an example simplified computing device for use with dynamic reactive compensation.

As a simplified example, FIG. 9 is a schematic block diagram of an example device 900 that may be used with one or more embodiments described herein, e.g., as any of the computing devices shown above, particularly the dynamic reactive compensation device 210, or any other related computing and/or communication device that supports the operations of the techniques herein (e.g., remote power control circuitry, centralized grid controllers, etc.). The simplified device 900 may comprise one or more communication interfaces 910 (if any), one or more processors 920, one or more sensors 930, and a memory 940 interconnected by a system bus 950, and is powered by one or more power supplies 960 (e.g., AC grid power, independent DC power, etc.). One or more reactive compensation components 970 may also be located locally on the device, as described above.

If present, the communication interface(s) 910 include the mechanical, electrical, and signaling circuitry for communicating data over ports (wired or wireless), such as cellular, Ethernet, WiFi, and so on. The communication interfaces may be configured to transmit and/or receive data using a variety of different communication protocols.

The memory 940 comprises a plurality of storage locations that are addressable by the processor(s) 920 for storing software programs and data structures associated with the embodiments described herein. The processor 920 may comprise necessary elements or logic adapted to execute the software programs and manipulate the data structures 945. An operating system 942, portions of which are typically resident in memory 940 and executed by the processor(s), functionally organizes the device by, among other things, invoking operations in support of software processors and/or services executing on the device. These software processors and/or services may comprise a sensor collection process 946 (e.g., to determine the real and reactive power), a dynamic reactive compensation control process 947 (e.g., to compute the adjusted amount of reactive power), a communication process 948 (e.g., to instruct other devices to act, and/or to receive instructions), and so on, as described above.

The one or more reactive compensation components 970 are configured to produce and/or absorb kVAR (reactive power) according to the instructions from the associated dynamic reactive compensation control process 947. For example, reactive compensation components 970 may comprise a local DC power supply, one or more reactive power inverters, or other compensation components that will be understood by those skilled in the art.

It will be apparent to those skilled in the art that other processor and memory types, including various computer-readable media, may be used to store and execute program instructions pertaining to the techniques described herein (e.g., microprocessors, EEPROMs, etc.). Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 10:
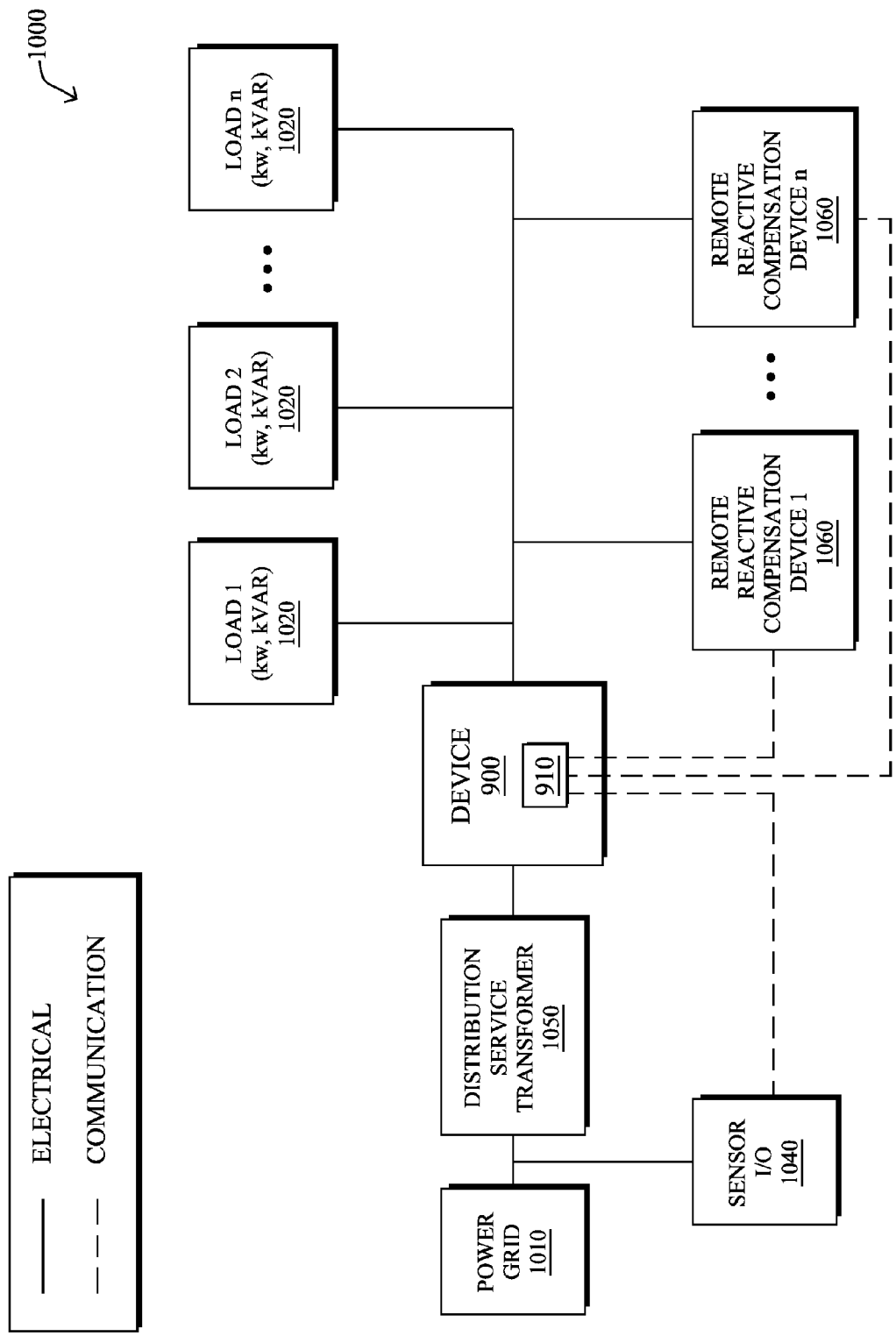
FIG. 10 illustrates an example computing system for use with dynamic reactive compensation.

FIG. 10 is a schematic block diagram of a simplified example system 1000 that may be used with one or more embodiments described herein, particularly showing the dynamic reactive compensation device 900 in place with illustrative power grid components and their interconnections. For example, the power grid 1010 may provide power to one or more loads 1020 (e.g., consumers, houses, businesses, etc.) through a distribution transformer 1050 (e.g., transformer 120 above). Various high-side sensors 1040 may optionally be configured to determine the high-side voltage characteristics on the primary side of the distribution/service transformer 1050 (120), with the sensors 1040 communicating with the device 900. The reactive compensation device 900 may comprise one or more sensors (e.g., low-side sensors) as mentioned above to measure the real and reactive power through the transformer 1050 for algorithm calculation herein by the device 900. Accordingly, the device 900 (e.g., controller/memory/user interface, etc.) takes the real-time readings of the real and reactive power, and computes the required amount of reactive power adjustment (e.g., production and/or absorption). As further described above, the dynamic reactive compensation device 900 may then adjust the reactive power either locally, or by commanding one or more remote reactive compensation devices 1060, or through a combination of both local and remote control.

It should be noted again that the schematic designs of the device 900 and/or the system 1000 are meant as examples for illustration, and are not meant to be limiting to the scope of the embodiments herein. In particular, other connections, components, orientations, configurations, and so on may be functionally configured to perform one or more aspects of the present disclosure.

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a computing device, a real power flow at a transformer at a given time;
    determining, by the computing device, a reactive power flow at the transformer at the given time;
    computing, by the computing device based on the real power and reactive power flow at the transformer, an amount of reactive power adjustment to produce a desired voltage differential across the transformer; and
    adjusting, by the computing device, the reactive power flow from a secondary side of the transformer at substantially the given time based on the computed amount;
    wherein the transformer is one of a plurality of transformers along a feeder line, and wherein the desired voltage differential across each particular transformer of the plurality of transformers is specifically based on accounting for feeder line impedance between the plurality of transformers along the feeder line, in order to produce substantially the same voltage output on corresponding secondary sides of the plurality of transformers.

2. The method as in claim 1, wherein adjusting comprises: producing reactive power.

3. The method as in claim 1, wherein adjusting comprises: absorbing reactive power.

4. The method as in claim 1, wherein the desired voltage differential corresponds to approximately zero.

5. The method as in claim 1, wherein computing the amount of reactive power adjustment to produce a desired voltage differential across the transformer is further based on adding a fixed reactive power adjustment to bias the voltage differential across the transformer.

6. The method as in claim 1, wherein the computed amount of reactive power adjustment to produce the desired voltage differential across the transformer is substantially equal to:
    a negative of: the real power flow at the transformer times a multiplier, plus the reactive power flow at the transformer.

7. The method as in claim 6, wherein the multiplier is computed as a ratio of a resistance of the transformer to a reactance of the transformer.

8. The method as in claim 7, further comprising:
    determining at least one or both of the resistance of the transformer and the reactance of the transformer based on actual measurements performed by the computing device on the transformer.

9. The method as in claim 6, wherein the multiplier is based on an assumed ratio of a resistance of the transformer to a reactance of the transformer.

10. The method as in claim 6, further comprising:
    adjusting the multiplier to account for additional service wires from the transformer.

11. The method as in claim 1, further comprising:
    sensing, computing, and adjusting over time to reduce fluctuations in voltage at the secondary side of the transformer over time.

12. The method as in claim 11, further comprising:
    maintaining the adjustment over time in response to the fluctuations in voltage remaining within a specified band of acceptable voltage change; and
    sensing, computing, and adjusting in response to the fluctuations in voltage falling outside the specified band of acceptable voltage change at any particular time.

13. The method as in claim 1, wherein adjusting comprises:
controlling circuitry local to the computing device.

14. The method as in claim 1, wherein adjusting comprises:
directing circuitry on a remote device.

15. The method as in claim 1, wherein adjusting comprises:
controlling circuitry local to the computing device; and
directing circuitry on a remote device to adjust reactive power;
wherein the reactive power adjustment by both the circuitry local to the computing device and the circuitry on the remote device combine to produce the desired voltage differential across the transformer.

16. The method as in claim 15, wherein controlling circuitry local to the computing device occurs at substantially the given time, and wherein directing circuitry on the remote device to adjust reactive power occurs at a slower response rate than the circuitry local to the computing device.

17. The method as in claim 1, wherein adjusting comprises:
controlling inverter circuitry.

18. The method as in claim 1, wherein sensing the real power flow through the transformer comprises:
sensing voltage and current at the secondary side of the transformer; and
computing the real power as a real component of the product of the voltage and a complex conjugate of the current.

19. The method as in claim 1, wherein sensing the reactive power flow through the transformer comprises:
sensing voltage and current at the secondary side of the transformer; and
computing the reactive power as an imaginary component of the product of the voltage and a complex conjugate of the current.

20. The method as in claim 1, wherein the transformer is a power grid distribution service transformer.

21. An apparatus, comprising:
a processor configured to execute one or more processes; and
a memory configured to store a process, the process, when executed by the processor, operable to:
determine a real power flow at a transformer at a given time;
determine a reactive power flow at the transformer at the given time;
compute, based on the real power and reactive power flow at the transformer, an amount of reactive power adjustment to produce a desired voltage differential across the transformer; and
adjust the reactive power flow from a secondary side of the transformer at substantially the given time based on the computed amount;
wherein the transformer is one of a plurality of transformers along a feeder line, and wherein the desired voltage differential across each particular transformer of the plurality of transformers is specifically based on accounting for feeder line impedance between the plurality of transformers along the feeder line, in order to produce substantially the same voltage output on corresponding secondary sides of the plurality of transformers.

22. The apparatus as in claim 21, wherein the process, when executed to adjust, is further operable to at least one of either:
produce reactive power; and
absorb reactive power.

23. The apparatus as in claim 21, wherein the computed amount of reactive power adjustment to produce the desired voltage differential across the transformer is substantially equal to:
a negative of: the real power flow at the transformer times a multiplier, plus the reactive power flow at the transformer.

24. The apparatus as in claim 23, wherein the multiplier is computed as a ratio of a resistance of the transformer to a reactance of the transformer.

25. The apparatus as in claim 21, further comprising:
circuitry configured to adjust the reactive power flow from the secondary side of the transformer; and
wherein the process, when executed to adjust, is further operable to control the circuitry.

26. The apparatus as in claim 21, wherein the process, when executed to adjust, is further operable to:
direct circuitry on a remote device.

27. The apparatus as in claim 21, wherein the process, when executed to sense the real and reactive power flows through the transformer, is further operable to:
sense voltage and current at the secondary side of the transformer;
compute the real power as a real component of the product of the voltage and a complex conjugate of the current; and
compute the reactive power as an imaginary component of the product of the voltage and the complex conjugate of the current.

28. A tangible, non-transitory, computer-readable medium storing program instructions that cause a computer to execute a process, the process, when executed by a processor, operable to:
determine a real power flow at a transformer at a given time;
determine a reactive power flow at the transformer at the given time;
compute, based on the real power and reactive power flow at the transformer, an amount of reactive power adjustment to produce a desired voltage differential across the transformer; and
adjust the reactive power flow from a secondary side of the transformer at substantially the given time based on the computed amount;
wherein the transformer is one of a plurality of transformers along a feeder line, and wherein the desired voltage differential across each particular transformer of the plurality of transformers is specifically based on accounting for feeder line impedance between the plurality of transformers along the feeder line, in order to produce substantially the same voltage output on corresponding secondary sides of the plurality of transformers.

* * * * *